May 22, 1962 HANS-WERNER PIEPLOW ET AL 3,035,786

SOUND TAPE APPARATUS

Filed July 5, 1957 4 Sheets-Sheet 1

Inventors
Hans-Werner Pieplow
Helmut Haas
Helmut Harnisch
By Ralph B. Stewart
attorney

SOUND TAPE APPARATUS

Filed July 5, 1957 4 Sheets-Sheet 2

Inventors
Hans-Werner Pieplow
Helmut Haas
Helmut Harnisch
By Ralph B. Stewart
attorney May 22, 1962 HANS-WERNER PIEPLOW ET AL 3,035,786

SOUND TAPE APPARATUS

Filed July 5, 1957 4 Sheets-Sheet 3

Inventors
Hans-Werner Pieplow
Helmut Haas
Helmut Harnisch
By Kemon, Palmer & Stuart
Attorneys May 22, 1962 HANS-WERNER PIEPLOW ET AL 3,035,786

SOUND TAPE APPARATUS

Filed July 5, 1957 4 Sheets-Sheet 4

Inventors
Hans-Werner Pieplow
Helmut Haas and
Helmut Harnisch
By Kemon, Palmer & Stewart
attorneys 3,035,786
Patented May 22, 1962

3,035,786

SOUND TAPE APPARATUS

Hans-Werner Pieplow and Helmut Haas, Nurnberg, and Helmut Harnisch, Furth, Germany, assignors to Max Grundig, Furth, Germany Filed July 5, 1957, Ser. No. 670,189
Claims priority, application Germany Jan. 30, 1957
8 Claims. (Cl. 242—55.13)

The present invention is concerned with improvements of sound-tape apparatus and more particularly with the sound-tape box and the cooperating parts of the apparatus.

The main purpose of the present invention is to provide for open-ended sound-tape, a sound-tape box that combines the advantages of all-sided protection of an open-end sound-tape laid therein, the capability of safely transporting this sound-tape, small expense of production and simplicity of handling. The term "open-ended" applies to a tape having two free ends as distinguished from a tape having its ends joined together to form an endless band.

The device comprises an entirely enclosed sound-tape box with a passage for the exit or entrance, as the case may be, of an open-ended sound-tape, that is laid in the box in the form of a coil about a rotatable hub. With a sound-tape box of this kind with an open-ended tape, the above-mentioned advantages are attained in a novel manner by a two-part box housing, that is formed on the one hand by a lower part forming at the same time a flange and the hub of a spool, that can be thrust on the spool-plate pin of the sound-tape apparatus and on the other hand by an upper part placed on the lower part so that it can turn on the same and can be connected in a non-turning manner to the sound-tape apparatus. In this way, not only in operation, but during carrying of the tapes, a far-reaching protection of the encased open-ended tapes from damage, dust and similar detrimental influences is afforded, and considerable lengthening of the life and less loss of the quality of the same in use is attained. Another advantage of the proposed box is that commercially available sound-tape apparatus can be used for the same with only slight adaptation.

Figure 1:
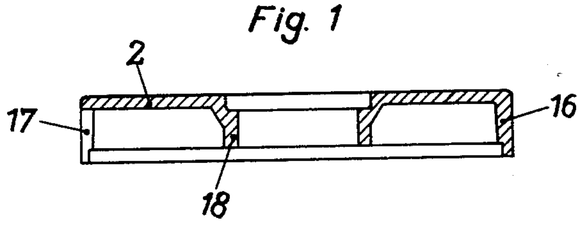
Figure 2:
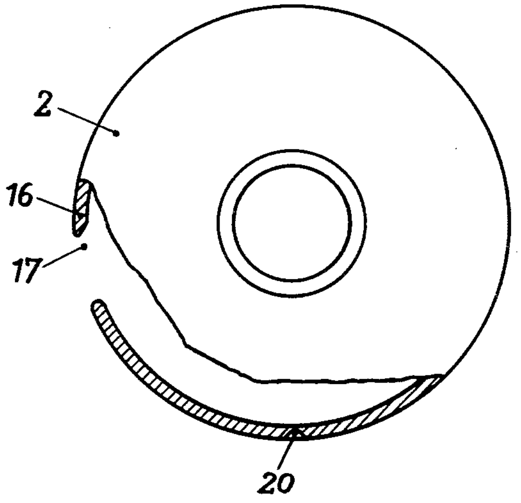
Figure 3:
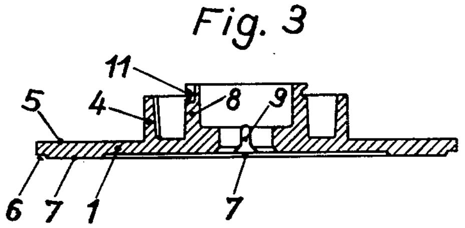
Figure 4:
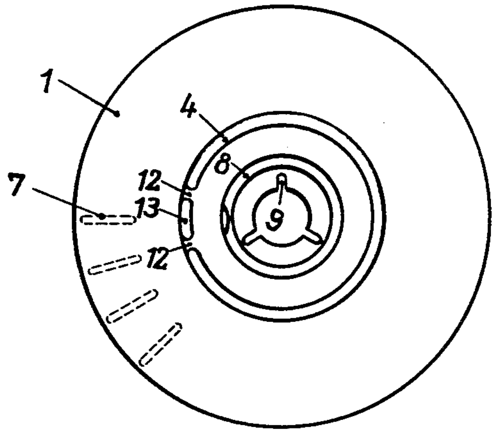
Figure 5:
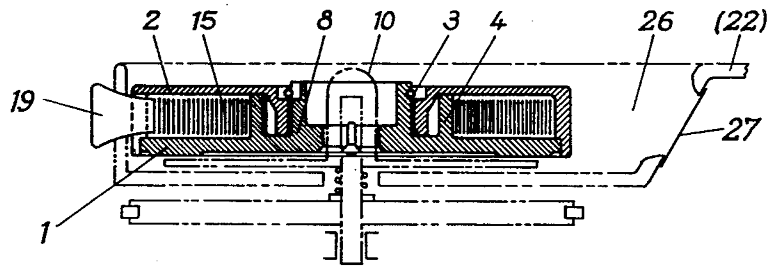
Figure 6:
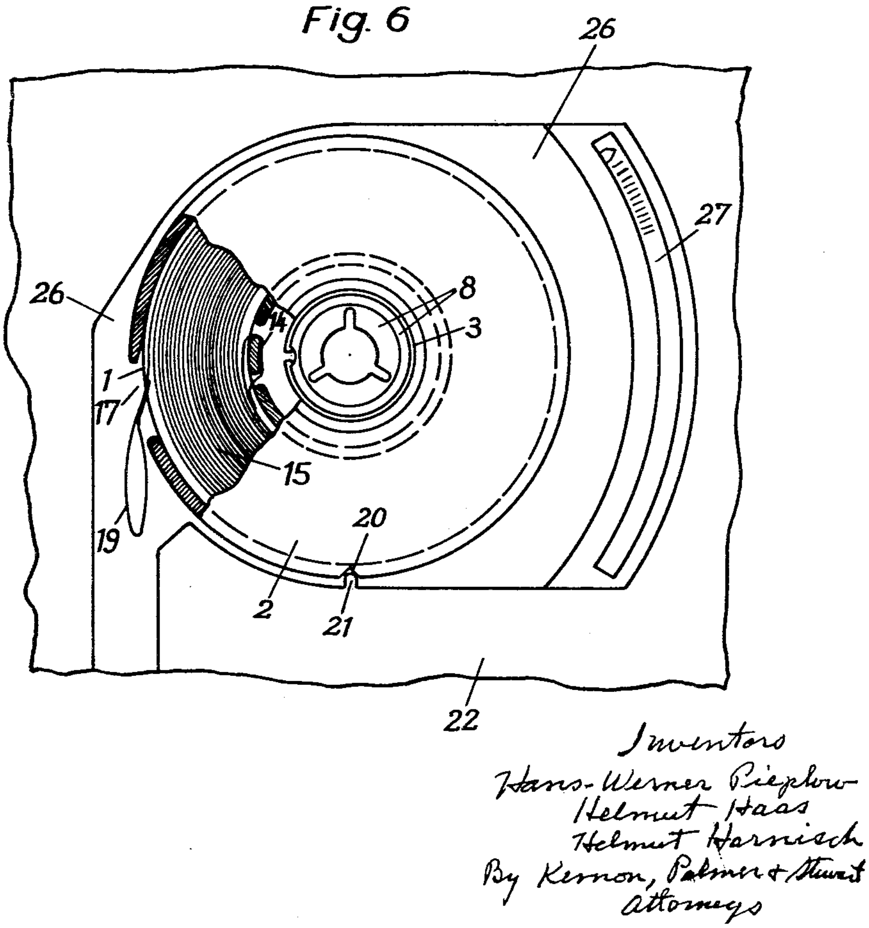
Figure 6A:
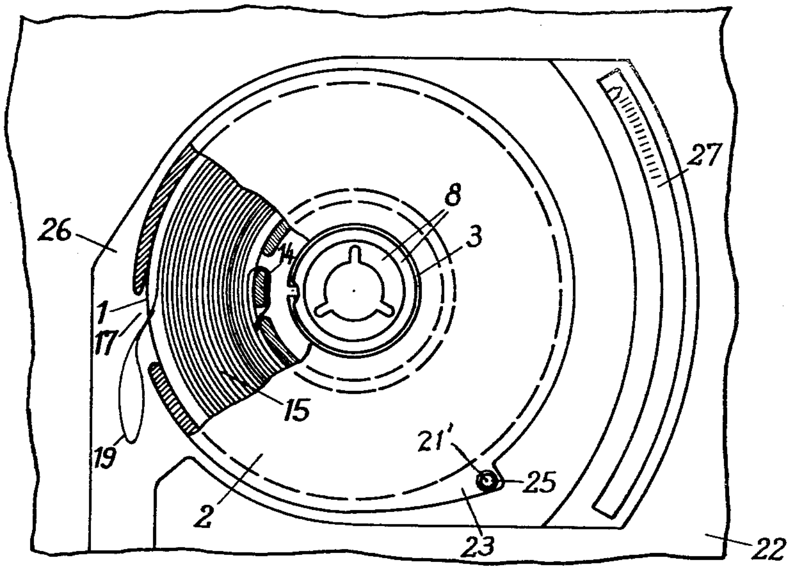
Figure 6B:
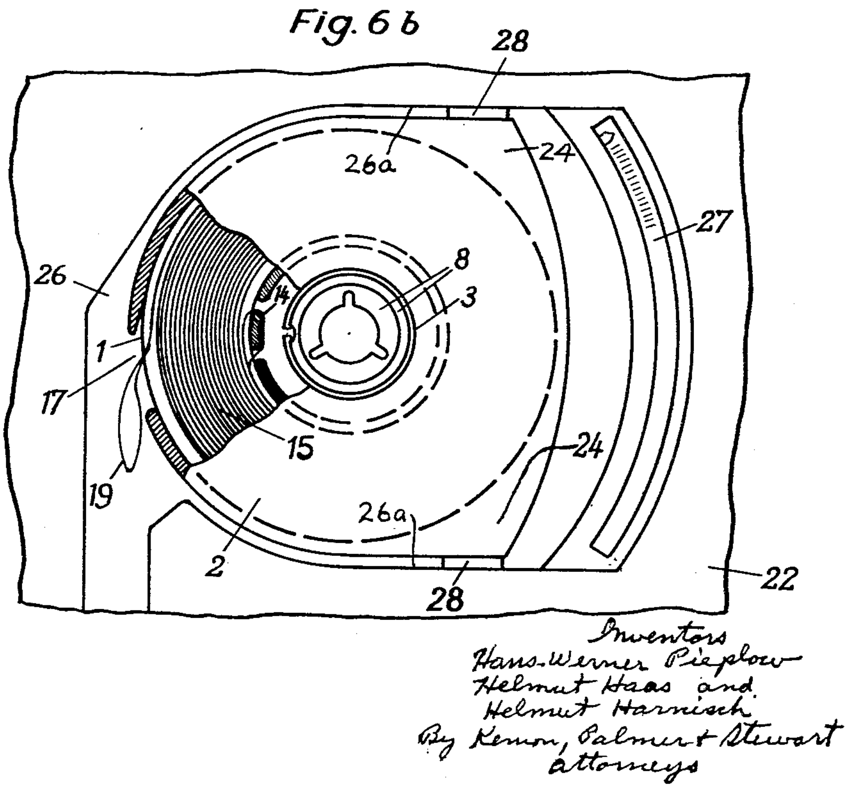

In the drawings, FIGS. 1 and 2 show the upper part of the sound-tape box in cross-section and plan view with part broken away;

FIGS. 3 and 4 disclose the corresponding lower part in section and in a view from above;

FIGS. 5 and 6 show the assembled box in cross-section and a view from above, partially cut away for better understanding, in position on the spool-plate of a sound-tape apparatus; and FIGURES 6*a* and 6*b* are plan views of alternative constructions for holding the upper part of the box against rotation with the lower part.

The sound-tape box intended for receiving an open-ended sound-tape, for instance of a magnetic sound dictating apparatus, comprises two plastic parts, for instance of polystyrene, shown in FIGS. 1 and 2, and 3 and 4, respectively. The two plastic parts form a sound-tape box closed on all sides when assembled, the one constituting the lower part is in the shape of a single-flange spool member 1, while the other, constituting the upper part 2, is received on the lower part so that it can turn relative to the same and is capable of connection to the sound-tape apparatus in a non-turning manner. The two plastic parts 1, 2 are connected together, with the possibility of relative turning, by the use of an annular or split-ring spring 3 of metal or resilient plastic in the manner seen in FIG. 5 and described more in detail hereinafter. Instead of the split-ring 3, a closed resilient ring of metal or plastic could be used. The lower part 1 in the form of a single-flange spool member is provided with a spool hub 4 and the flange 5, the outer face 6 of flange 5 having an uneven surface increasing the ease of grasping the same. This uneven surface is produced for instance by a number of ribs 7 running radially and symmetrically through 360°. The lower part 1, moreover, has a central hub 8 to fit on the spool-plate pin of the sound-tape apparatus. The hub 8 is formed as a unit with the flanged spool. The hub 8 has three symmetrically distributed recesses 9 for non-rotatably mounting the lower part 1 on the spool-plate pin 10 (shown in dotted lines in FIG. 5) which is provided with corresponding fins engaging the recesses 9. Adjacent the upper end of the spool-plate hub 8 is an annular groove 11 for receiving of the annular spring 3. The spool hub 4 is provided with a stud-like portion 13 for receiving the loop 14 at the inner end of the sound-tape. The stud 13 is formed by slotting the spool hub 4 at 12, 12. The sound-tape is thus prevented from pulling out of the sound-tape box.

The upper part 2 has mainly the shape of a flat box cover, that has at the outer edge a collar-like flange 16 provided with an opening 17 for the passage of the tape into the box, and an inner second collar-like flange 18, which, when the upper part 2 is mounted on the lower part 1, fits on the spool-plate receiving hub 8 of the latter. After the upper part 2 is thrust on the lower part 1, the two parts are held together by the insertion of the annular spring 3 in the annular groove 11 formed in the hub 8.

The sound tape 15 inserted in the box and secured by the inner end 14 of the tape before assembly, in the manner already described, is furnished also at the outer end with a loop or tab 19 that is constricted inwards (in the direction of the width and/or thickness of the tape) so that the tab 19 wedges in the opening 17 upon being pulled into the box. A resilient plastic, for instance, polyvinylchloride (known by the trade name "Iselit") is used as material for this tab, since this material can adhere easily to the material of the sound-tape and wedges resiliently in the opening 17, so that the outer end of the tab 19 can be drawn out easily but does not loosen of itself. In this way, the tape-coil is prevented from unrolling and being damaged in case the removed sound-tape box falls. By the above-mentioned uneven surface of the outer face 6, for instance in the form of the radially running ribs 7, it is easier to manually rotate the part 1 with respect to part 2 and thereby pull in and wedge the outer end of the tape with the tab 19 in the slot 17 in case the box is removed from the apparatus. After placing the case containing the supply spool on the spool plate of the sound-tape apparatus, the tape-loop 19 is drawn out of the box slot 17 and placed over the shaft of the take-up spool of said apparatus or a shoulder of this spool parallel to the axis.

As already mentioned, the lower part 1 of the box when placed on the spool-plate pin 10 (FIG. 5) is connected to turn with the same, while on the other hand the upper part 2 is connected to the sound-tape apparatus so as not to turn relative to the same, and with slot 17 properly aligned to feed the sound-tape as shown in FIG. 6. For this purpose, in the edge portion 16 of the upper part 2, there can be a recess 20 (FIG. 6) narrowing upwards preferably, that fits a corresponding projection 21 on a fixed part of the sound-tape apparatus, such as in the cover-plate 22. On the other hand, the spool-plate hub 8 of the lower part 1 is secured in a form-fitting manner to the spool-plate pin 10 and rotates therewith. The aforementioned projection 21 of the sound-tape apparatus enters into recess 20 in the edge portion 16 of the upper part 2 of the sound-tape box and secures the upper part 2 in proper alignment as shown in FIG. 6. The aforementioned projection 21 on the sound-tape apparatus is preferably made in the form of a rib, a pin, a key or the like, perpendicular to the axis of the box and resilient so that it can be pressed aside when standard flanged spools are set on. In this way, a sound-tape apparatus operated with boxes of the type proposed above can also be used with the ordinary commercial flanged spools.

Proper orientation of the sound-tape box relative to the sound tape apparatus may also be attained by thickening the edge portion of the upper part of the box as at 23 in FIG. 6*a*, this thickened portion being provided with a centering or aligning recess 25 receiving a fixed pin 21' supported by plate 22. In another form, the edge portion may be partially thickened as shown at portions 24, 24 in FIG. 6*b*. The outer walls of these portions are shaped so that the box when inserted in a corresponding recess 26 formed in the upper cover plate 22 of the sound-tape apparatus fits into the recess in form-fitting and aligned manner without relative rotation. Two felt cushions indicated by 28 in FIG. 6*b* are inserted between the thickened portions 24, 24 and the side walls 26*a*, 26*a* of the recess. The wall of recess 26 is provided with a transparent window 27 which carries a scale to indicate the length of tape on the spool at any given time.

The connection of the box to the sound-tape apparatus is always produced positively, without further manipulation, by inserting or setting-on the box.

The box can be made wholly or partly of a non-combustible material, in particular a heat-insulating material, at least however the part for the rotating bearing of the upper part 2 on the lower part 1. Those bearing materials that can be used for a continuing stress at high numbers of revolution of more than 500 r.p.m. are employed at the places where the upper and lower parts slide against each other in rotation.

The invention is, of course, not limited to the example shown; on the contrary, the construction of the important details can be changed without departing from the scope of the following claims.

We claim:

1. The combination, with a sound-tape apparatus having a fixed part and a rotatable spool-plate pin, of a sound-tape box enclosed on all sides and provided with a slot in the edge thereof for the passage of a sound-tape, said box including an upper part and a lower part, means connecting the lower part to the upper part for relative rotation thereto, said lower part comprising a hub portion carrying a radial flange forming the lower end wall of said box and being provided with means engaging said spool-plate pin and connecting said lower part thereto for rotation therewith, said upper part comprising a sleeve in telescoping relation with the hub portion of said lower part and having a radial flange forming the upper end wall of said box and a wall portion forming the peripheral wall of said box, said upper part having means engaging the fixed part of the sound-tape apparatus and securing the upper part against rotation relative thereto, and means on said lower part for securing the inner end of a sound tape thereto.

2. The combination as set forth in claim 1 wherein the means for securing the upper part without relative rotation to the fixed part of the sound tape apparatus includes a recess formed in the periphery of the upper part and a projection on the fixed part of the sound-tape apparatus entering into said recess when the sound-tape box is placed on the spool-plate pin of the sound tape apparatus.

3. The combination as set forth in claim 1 wherein the means for securing the upper part without relative rotation to the fixed part of the sound tape apparatus includes a recess formed in the periphery of the upper part and a projection on the fixed part of the sound-tape apparatus entering into said recess when the sound-tape box is placed on the spool-plate pin of the sound-tape apparatus, said projection being resilient so that it may be pressed aside when inserting a standard spool that has an unrecessed periphery.

4. The combination set forth in claim 1, wherein the upper part of the sound-tape box is secured against rotation relative to the fixed part of the sound-tape apparatus by recessing the cover plate of the sound-tape apparatus around the spool-plate pin to receive the sound-tape box and thickening a portion of the upper part of the sound-tape box and shaping the recess to form-fit a portion of said thickened portion when the box is placed on the pin whereby proper orientation of the sound-tape box relative to the sound-tape apparatus is attained.

5. The combination as set forth in claim 1 wherein the means for securing the upper part without relative rotation to the fixed part of the sound tape apparatus includes a projection formed at the periphery of the upper part and a recess on the fixed part of the sound-tape apparatus for receiving said projection when the sound tape box is placed on the spool-plate pin of the sound tape apparatus.

6. A sound-tape box comprising a lower part and an upper part, said lower part having a plate portion forming the lower wall of said box and a circular hub extending upwardly from said plate portion and forming a spool for said tape, a second circular hub of smaller diameter extending upwardly from said plate portion concentric with said first hub but spaced therefrom, said lower part having a central aperture formed on the axis of said hubs for receiving the driving pin of the sound tape apparatus in driving engagement therewith, said upper part comprising a plate portion forming the upper wall of said box and having a depending flange forming the side closure of the box with a slot formed therein for the passage of sound-tape, a circular hub depending from the plate portion of said upper part into the space between the hubs on the lower part and having close fitting relation with one hub of said lower part to provide a bearing between said upper and lower parts.

7. A sound-tape box according to claim 6 wherein the central hub of said lower part extends through the hub of said upper part and is provided with an annular groove formed in its outer surface beyond the upper end of the hub in the upper part, and a spring ring mounted in said groove and extending radially over the upper end of the hub of the upper part for holding said box parts assembled.

8. A sound-tape box for use with sound-tape apparatus having a rotatable spool-plate pin, said box including a lower part and an upper part adapted to be secured to a non-rotating part of a sound-tape apparatus, said lower part including a hub and a radially extending circular flange adjacent one end of the hub and an annular groove formed in the surface of the hub adjacent the other end of the hub, said hub being provided with means for engaging the spool-plate pin of the sound-tape apparatus in driving relation, the upper part including a portion forming the top wall of said box and a depending flange forming the side closure of the box and having a slot formed therein for the passage of a sound-tape, said top-wall portion of said upper part having a central aperture receiving the hub of the lower part when the box is assembled, said upper part having an annular recess formed therein at the upper end of said central aperture, and resilient means located within said annular recess and engaging in the groove of the hub and holding the box assembled.

References Cited in the file of this patent

UNITED STATES PATENTS

| | | |
|---|---|---|
| 2,537,883 | Ernisse | Jan. 9, 1951 |
| 2,552,200 | Mihalyi | May 8, 1951 |
| 2,600,409 | Lippert | June 17, 1952 |